Jan. 22, 1952 K. BEERLI 2,583,080
JOURNAL FOR SPINNING AND TWISTING SPINDLES
Filed July 13, 1950
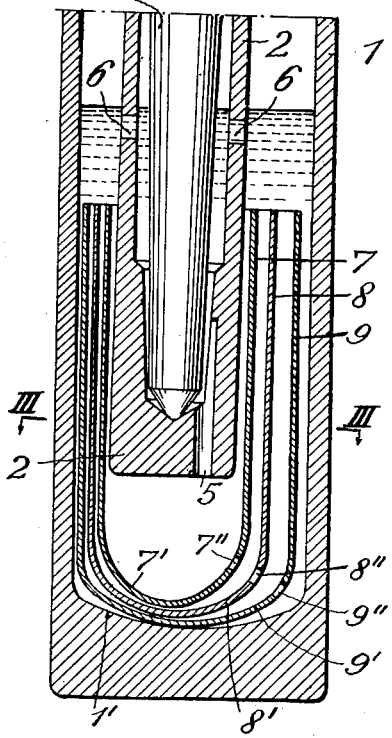
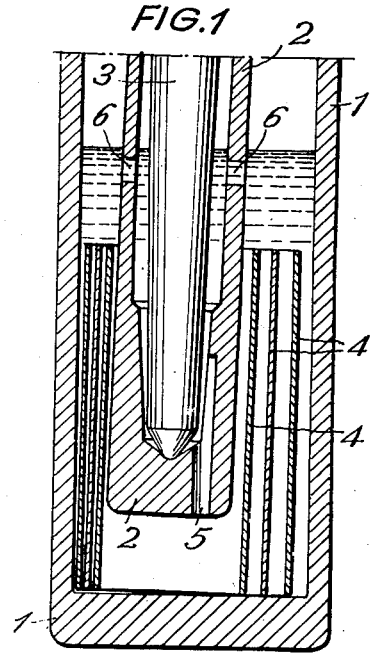
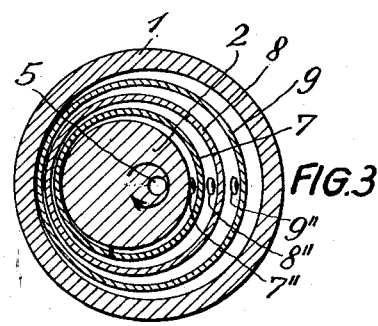
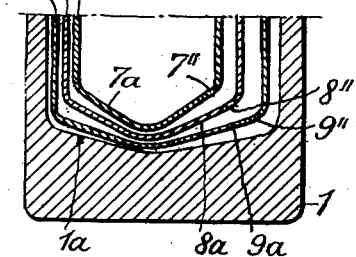
INVENTOR:
Karl Beerli, Patented Jan. 22, 1952

2,583,080

UNITED STATES PATENT OFFICE 2,583,080

JOURNAL FOR SPINNING AND TWISTING SPINDLES

Karl Beerli, Nieder-Uster, Switzerland, assignor to Spindel-, Motoren- und Maschinenfabrik A. G., Uster, Switzerland Application July 13, 1950, Serial No. 173,505
In Switzerland July 14, 1949

6 Claims. (Cl. 308—152)

This invention relates to spinning and twisting or doubling spindles of the type having a journal bushing suspended in a casing. In order to dampen the circular or pendular motion of the journal bushing, there are used spirally wound blade springs or cylindrical sleeves fit into each other, a certain play being provided between successive windings of the spring or between adjacent sleeves.

During operation of the spindle, the journal bushing effects an oscillatory movement whose magnitude depends on the size of the excentric mass and on the play which is provided in the damping device, while the frequency of the oscillations results from the speed of the spindle.

The present invention is based on the experience that in case of greatly unbalanced masses in the winding spindle resulting in a large amplitude of the upper part of the rotating spindle and accordingly also of the journal bushing associated therewith, as well as in case of an elevated speed of the spindle and of a fast oscillatory movement of the journal bushing of the spindle, the oil in the spindle casing, after a certain time of operation, will be squeezed out of the intermediate spaces of the damping device, formed by the mentioned plan, the damping action thus being ineffective.

The performance of such a spindle will now be explained with reference to Fig. 1 of the accompanying drawings. This figure shows a partial longitudinal section of a spindle. I designates the journal casing and 2 the journal bushing which in known manner is suspended in the journal casing, and which is provided at its lower end with a thrust bearing for the working spindle 3; 4 indicates three sleeves which are loosely fit into each other, a play being provided between adjacent sleeves which rest on the bottom of the casing I between the peripheral wall of the casing I and the journal bushing 2; the journal bushing 2 is provided with a vertical passage 5 and with transverse holes 6 spaced from the passage 5, but still beneath the oil level.

In operation, if the working spindle 3 rotates, the oil under the influence of the oscillations of the journal bushing 2 and of the sleeves 4 will be driven upwardly in the intermediate spaces between the sleeves, particularly where these spaces widen upwardly as on the left side of the bushing 2 in Fig. 1. As however, the sleeves 4 rest on the bottom of the casing I with a continuously altering abutment area owing to their oscillatory movement, it will be impossible to compensate the upwardly driven oil by a sufficient downstream oil to ensure a steady circulation; the continuous flow of oil therefore will be interrupted and the damping action ceases. After the spindle 3 has been stopped, the said intermediate spaces will gradually be filled again with oil, the damping action again being established during the first moments of the following operation.

Also in such spindles in which the damping spring or the sleeves do not rest on the bottom of the spindle casing, the circulation of the oil as a result of the fast oscillatory movement is rendered so difficult that the intermediate spaces gradually empty and the damping action thus ceases; this latter will only be reestablished after the spindle has been stopped for some time.

The invention relates to a journal bearing for spinning- and twisting-spindles having sleeves which are disposed between the journal casing and the journal bushing of the spindle, these sleeves being placed one into the other with a play between them, and being destined to dampen the oscillations which occur during operation of the spindle.

The object of the invention is to eliminate the described disadvantage by providing sleeves having differently curved bottoms, the bottom of the sleeve next to the journal bushing having the greatest convexity, and the bottoms of all sleeves being provided with openings for the passage of a damping liquid.

The provision of sleeves having a curved bottom results in a continuous circulation of oil or other damping liquid, so that even when continuously running the damping action in the journal bushing will be maintained. In the accompanying drawing, Fig. 1 is a partial longitudinal section of a spindle of the invention;

Fig. 2 shows a fragmentary longitudinal axial section through a spinning or twisting spindle according to the invention;

Fig. 3 shows a horizontal transverse section along the line III—III of Fig. 2;

Fig. 4 is a sectional view of the bottom end of a modified arrangement.

I indicates (as in Fig. 1) the journal casing, and 2 the journal bushing for the spindle 3, this bushing being suspended in the casing; the journal bushing 2 is provided in its bottom with a vertical passage 5 and in some distance of it with transverse holes 6 which are provided for the passage of damping oil. Between the peripheral walls of the casing I and the journal bushing 2 three cylindrical sleeves 7, 8, 9 are placed one into the other, leaving a play between them; these sleeves comprise each a downwardly curved bottom 7', 8', 9'. These bottoms 7', 8' and 9' of the three sleeves are differently curved, the bottom 7' of the innermost sleeve which is next to journal bushing 2 having the smallest radius of curvature, the bottom 8' of the middle sleeve is somewhat flatter, while the bottom 9' of the outermost sleeve 9 still is flatter. Accordingly, the convexity of the curved bottoms therefore progressively decreases from the innermost to the outermost sleeve, independently of the number of sleeves; the inner surface of the bottom 1' of the journal casing 1 is correspondingly curved and the joint between the bottom face and the cylindrical inner surface of the casing 1 is rounded. As a result an intermediate space is formed between adjacent bottoms of the sleeves 7, 8 and 9, as well as between the bottom of the outermost sleeve 9 and the bottom of the casing 1; this intermediate space in the direction towards the cylindric wall of the casing gradually becomes wider, so that wedge shaped oil spaces are formed when viewed in longitudinal section; the bottoms of the sleeves merge into the cylindrical sleeve walls by curvatures which become flatter from the outermost to the innermost sleeve, that is to say the curvature of the merging portion is the smallest for the inside sleeve and the greatest for the outside sleeve. The four oil spaces which are created in the described manner are interconnected by holes 7", 8" or 9" provided at the places where the bottoms merge into the cylindrical walls of the three sleeves 7, 8 and 9.

The diameters of the sleeves 7, 8 and 9 are in such relation to each other that the play between the innermost sleeve 7 and the bushing 2 is the smallest, the play between the sleeves 7 and 8 is greater, and the play between the sleeves 8 and 9 is still greater, i. e. this play is progressively increasing with the increasing diameter of the sleeves.

In the example shown in Fig. 4 the sleeves 7, 8 and 9 have downwardly bulged, cone-shaped bottoms 7a, 8a and 9a. These cone-shaped bottoms merge into the corresponding cylindrical walls of the sleeves by means of rounded portions, and as in the previous described example the cone-shaped bottom 7a of the innermost sleeve comprises the greatest, and the bottom 9a of the outermost sleeve the smallest convexity. The inside face of the bottom 1a of the casing 1 is correspondingly cone-shaped.

When in the described examples according to Figs. 2 to 4 oil escapes at the top of the sleeves from the intermediate spaces between them, oil from the casing will be sucked into the intermediate spaces at the bulged bottoms of the sleeves, thus preventing the oil circulation from being interrupted; the oil flows from the supply underneath the bottom of the bushing 2 thru the openings 7", 8" or 9" in the corresponding bottoms of the sleeves. In operation, the intermediate spaces formed between the sleeves will not become empty, and the oil remains in continuous circulation, thus always being cooled, which is of advantage for the durability of the oil; the heat from the uppermost layer of the oil is transmitted to the wall of the journal casing. Owing to the wedge-shaped tapered intermediate spaces between the bottoms of the sleeves, and between the bottom of the lowermost sleeve and the bulged bottom of the casing, oil is forced into between the superposed bottom surfaces and prevents a metallic contact between the sleeves and between the lowermost sleeve and the casing, so that wear of the bulged sleeve bottoms will be greatly reduced.

What I claim is:

1. A journal bearing for spinning and twisting spindles, comprising a journal casing adapted to contain a damping liquid, a journal bushing suspended within the casing, a plurality of cylindrical sleeves disposed in the lower part of the casing between said bushing and the casing wall, said sleeves being placed one into the other in radially spaced relationship, said sleeves having curved bottoms provided with apertures for the passage of said damping liquid.

2. A journal bearing as defined in claim 1, wherein the apertured bottoms of said sleeves being differently curved, the bottom of the innermost sleeve having the greatest convexity, and the convexity of the curvature of the bottoms progressively decreasing with increasing diameter of the sleeves.

3. A journal bearing for spinning and twisting spindles, comprising a journal casing adapted to contain a damping liquid, a journal bushing suspended within the casing, a plurality of cylindrical sleeves disposed in the lower part of the casing between said bushing and the casing wall, said sleeves being placed one into the other in radially spaced relationship, said sleeves having curved bottoms provided with apertures for the passage of said damping liquid, the bottom of the innermost sleeve immediately surrounding said journal bushing having the greatest convexity, while the convexity of the curvature of the bottoms of said sleeves progressively decrease with increasing diameter of the sleeves, the curved bottom of each sleeve merging by a curvature into the cylindrical wall of the corresponding sleeve, the convexity of said latter curvature increasing with increasing diameter of the sleeves.

4. A journal bearing for spinning and twisting spindles as defined in claim 3, wherein the inside bottom face of said journal casing is downwardly bulged.

5. A journal bearing for spinning and twisting spindles as defined in claim 1, wherein the bottoms of said sleeves are provided with a cone-shaped curvature, the bottom of the innermost sleeve forming the steepest cone, while the taper of the cone surface of the bottoms decreases with increasing diameter of the sleeves.

6. A journal bearing as defined in claim 1, wherein the diameter of the various sleeves placed one into the other increases in such manner that the play between successive sleeves progressively increases from the innermost of the outermost sleeve.

KARL BEERLI.

REFERENCES CITED

The following references are of record in the file of this patent:

UNITED STATES PATENTS

| Number | Name | Date |
|---|---|---|
| 2,350,272 | Cobb | May 30, 1944 |